US006239784B1

(12) United States Patent
Holmes

(10) Patent No.: US 6,239,784 B1
(45) Date of Patent: May 29, 2001

(54) EXO-SKELETAL HAPTIC COMPUTER HUMAN/COMPUTER INTERFACE DEVICE

(75) Inventor: Richard Holmes, Nuneaton (GB)

(73) Assignee: Retinal Displays, Inc., Palo Alto, CA (US)

( * ) Notice: Subject to any disclaimer, the term of this patent is extended or adjusted under 35 U.S.C. 154(b) by 0 days.

(21) Appl. No.: 08/329,994

(22) Filed: Oct. 27, 1994

(30) Foreign Application Priority Data

Apr. 20, 1991 (GB) .................................................. 9108497

(51) Int. Cl.$^7$ ........................................................ G09G 5/00

(52) U.S. Cl. ............................................. 345/156; 345/157

(58) Field of Search ..................................... 345/156, 157, 345/158; 364/146, 806; 901/34; 414/5, 7; 341/20, 21; 434/114

(56) References Cited

U.S. PATENT DOCUMENTS

| | | | | |
|---|---|---|---|---|
| 4,575,297 | * | 3/1986 | Richter | 414/5 |
| 4,988,981 | * | 1/1991 | Zimmerman et al. | |
| 5,184,009 | * | 2/1993 | Wright et al. | |
| 5,212,372 | * | 5/1993 | Quick et al. | |

FOREIGN PATENT DOCUMENTS

54238 * 5/1993 (JP) .

OTHER PUBLICATIONS

T. G. Zimmerman et al, "A Hand Gesture Interface Device," Chi+GI 1987, pp 189–192.*
J. D. Foley, "Interfaces for Advanced Computing," Scientific American, Oct. 1987, pp 127–135.*

* cited by examiner

Primary Examiner—Xiao Wu
(74) Attorney, Agent, or Firm—Young & Thompson

(57) ABSTRACT

To facilitate the monitoring of spatial and haptic movement and to provide tactile feedback, the invention replaces sheath-like glove human/computer interface devices with a manually operable exo-skeletal human/computer interface device (10) which comprises a wrist encircling means (11A, 11B) and a palm encircling means (16C) and a torsionally and laterally flexible manner (16D) connecting said wrist and palm encircling means, with said wrist encircling means being adapted in use to be proximate to and generally relatively fixed around the associated wrist of one hand of a user, with said palm encircling means being adapted in use to be proximate to and relatively fixed around the palm of said hand, with said palm encircling means having an overhand member (16B) overlying the back of said hand, further comprising at least one elongate generally resilient rib member (10A, 10B) extending at a fixed end thereof from said overhand member so as to be generally coextensive with at least one finger of said hand in order to function in the form of an exoskelton thereto, adjacent a free end of said rib member at least one annular ring formation (14) which is adapted in use to receive and engage at least one finger of the said hand, and at least one position sensor of the computer system fixed relative to at least one of the said members.

19 Claims, 5 Drawing Sheets

EXO-SKELETAL HAPTIC COMPUTER HUMAN/COMPUTER INTERFACE DEVICE

BACKGROUND OF THE INVENTION

This invention relates to a haptic computer input/output device and more specifically to human/computer interface equipment for use in association with a computer system running a virtual reality software applications program.

DESCRIPTION OF THE RELATED ART

In virtual reality applications the user of the system is presented with computer-generated images which change in response to changes in the notional relative positions of the viewer and the virtual object so that the viewer has the sense of occupying a fully three-dimensional, artificial world. Virtual reality is described in U.S. Pat Nos. 4,884,219 and 4,981,789 and reference is made thereto for a fuller understanding of the present invention.

It is desirable that the viewer of virtual objects should be able to 'interact' with them, such as by 'picking them up' and 'moving them about'. For this it is preferable that one of the objects viewed is a cursor representing e.g. the hand of a viewer and that the user dons a glove-type human/computer interface. By moving his real hand he causes corresponding movements of the cursor, and when this occupies the same apparent space as another virtual object the computer must react appropriately.

An example of such a glove is to be found in U.S. Pat. No. 4,905,001. The glove must house tactile feedback as well as position and movement input means. This results in a relatively bulky sheath surrounding the hand of a user which will constrain the free movement of the hand thereby reducing realism. In addition such a glove is not easy to don and doff and in arcade game applications the unwarranted time taken in doing so can be considered as machine down time.

OBJECT OF THE INVENTION

It is an object of the invention to provide a haptic human/computer interface device which is relatively easy to don and doff and which is generally less likely to constrain movement.

SUMMARY OF THE INVENTION

According to a first aspect of the invention a manually operable exo-skeletal human/computer interface device for a computer system comprises a wrist encircling means and a palm encircling means and a torsionally and laterally flexible member connecting said wrist and palm encircling means, with said wrist encircling means being adapted in use to be proximate to and generally relatively fixed around the associated wrist of one hand of a user, with said palm encircling means being adapted in use to be proximate to and relatively fixed around the palm of said hand, with said palm encircling means having an overhand member overlying the back of said hand, and further comprises at least one elongate generally resilient rib member extending at a fixed end thereof from said overhand member so as to be generally coextensive with at least one finger of said hand in order to function in the form of an exoskelton thereto, adjacent a free end of said rib member at least one annular ring formation which is adapted in use to receive and engage at least one finger of the said hand and at least one position sensor of the computer system fixed relative to at least one of the said members.

Preferably, said ring formation is formed integrally with the said elongate member. Alternatively, said ring formation is in the form of a hoop comprising an inner U-shaped component nested in an outer U-shaped component, said outer U-shaped component being integral at the free end of said elongate member.

Desirably, an elongate bore extends longitudinally through said elongate rib member and a strain gauge goniometer is housed within said bore. Communications apparatus of a spatial position sensing device may housed within said overhand member and/or said wrist encircling means and tactile feedback means may be provided as part of said annular ring formation.

Said palm encircling means may be of fixed circumference when in a free and unstressed state and may comprise an elasticated strap.

According to a second aspect of the invention a manually operable exo-skeletal human/machine interface device for a computer system comprises a torsionally and laterally flexible member connecting a wrist encircling means to a palm encircling means, with said wrist encircling means being adapted in use to be proximate to and generally relatively fixed around the associated wrist of one hand of a user, with said palm encircling means being adapted in use to be proximate to and relatively fixed around the palm of said hand, with said palm encircling means having an overhand member overlying the back of said hand, and further comprises five elongate generally resilient rib members each corresponding to an associated digit of the hand and each extending at a fixed end thereof from said overhand member so as to be generally coextensive with the associated digit in order to function in the form of an exoskeleton thereto, adjacent a free end of each said rib member at least one annular ring formation which is adapted in use to receive and engage said associated digit and at least one position sensor of the computer system fixed relative to at least one of the said members.

Typically, the device further comprises a second annular ring formation depending from one of said rib members intermediate the said two ends thereof. Preferably, the device further comprises second annular ring formations each depending from a corresponding one of said rib members intermediate the said two ends thereof.

According to a third aspect of the invention a manually operable exo-skeletal human/computer interface device for a computer system comprises a wrist encircling means and a palm encircling means and a torsionally and laterally flexible member connecting said wrist and palm encircling means, with said wrist encircling means being adapted in use to be proximate to and generally relatively fixed around the associated wrist of one hand of a user, with said palm encircling means being adapted in use to be proximate to and relatively fixed around the palm of said hand, with said palm encircling means having an overhand member overlying the back of said hand, and further comprises at least one elongate generally resilient rib member extending at a fixed end thereof from said overhand member so as to be generally coextensive with at least one finer of said hand in order to function in the form of an exoskeleton thereto with said elongate member having an upper surface and a plurality of integrally formed laterally extending reinforcement ribs disposed along said upper surface, adjacent a free end of said rib member at least one annular ring formation which is adapted in use to receive and engage at least one finger of the said hand and at least one position sensor of the computer system fixed relative to at least one of the said members.

According to a fourth aspect of the invention a manually operable exo-skeletal human/computer interface device for a computer system comprises a wrist encircling means and a palm encircling means and a torsionally and laterally flexible member connecting said wrist and palm encircling means, with said wrist encircling means being adapted in use to be proximate to and generally relatively fixed around the associated wrist of one hand of a user, with said palm encircling means being adapted in use to be proximate to and relatively fixed around the palm of said hand, with said palm encircling means having an overhand member overlying the back of said hand, and further comprises at least one elongate generally resilient rib member extending at a fixed end thereof from said overhand member so as to be generally coextensive with at least one finger of said hand in order to function in the form of an exoskeleton thereto, adjacent a free end of said rib member at least one annular ring formation which is adapted in use to receive and engage at least one finger of the said hand, at least one position sensor of the computer system fixed relative to at least one of the said members and a portion of said rib member has movement sensing means associated therewith.

Preferably, at least a portion of said rib member has an elongate passageway extending therealong which houses said movement sensing means. Additionally, at least one elongate passageway may extend through said laterally flexible member between said wrist encircling means and said palm encircling means with said passageway housing movement sensing means.

According to a fifth aspect of the invention a manually operable exo-skeletal human/computer interface device for a computer system comprises a wrist encircling means being adapted in use to be proximate to and generally relatively fixed around the associated wrist of one hand of a user, an overhand member in use overlying the back of said hand and a laterally flexible member connecting said wrist encircling means to said overhand member, and further comprises at least one elongate generally resilient rib member extending at a fixed end thereof from said overhand member so as to be generally coextensive with at least one finger of said hand in order to function in the form of an exoskeleton thereto, adjacent a free end of said rib member at least one annular ring formation which is adapted in use to receive and engage at least one finger of the said hand and at least one position sensor of the computer system fixed relative to at least one of the said members.

Typically, the device further comprises a palm encircling means associated with said overhand member, wherein said palm encircling means is of fixed circumference when in a free and unstressed state. The palm encircling means may comprise an elasticated strap.

BRIEF DESCRIPTION OF THE DRAWINGS

An embodiment of the invention will now be described by way of example only and with reference to the accompanying drawings, in which.

DESCRIPTION OF THE PREFERRED EMBODIMENTS

Figure 1:
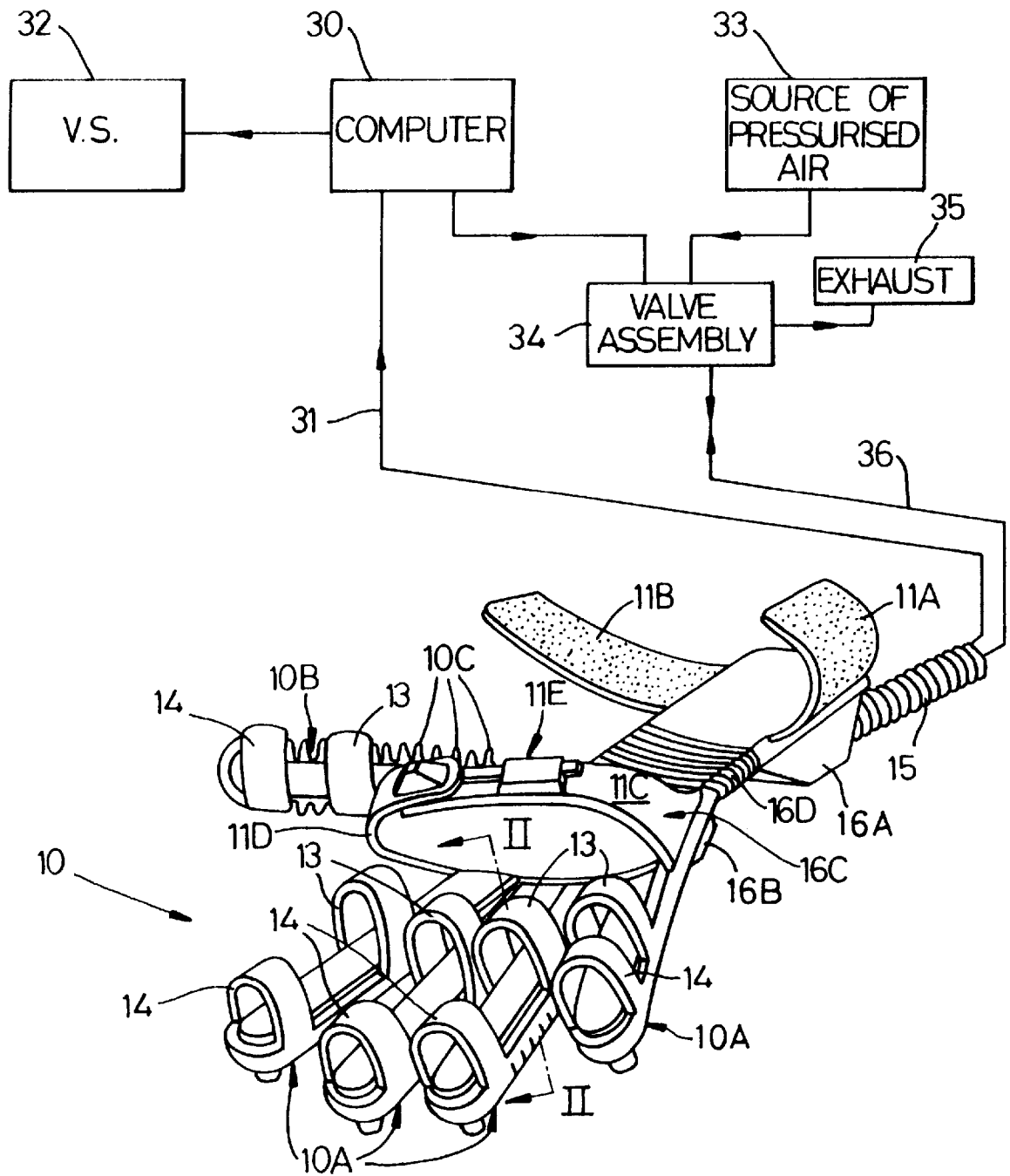
FIG. 1 illustrates an underside view of a data glove in association with other components of a virtual reality system.

The human/computer interface exoskeleton device or data glove 10 illustrated in FIG. 1 is adapted to be worn on the back of the hand and wrist of a user by the provision of self-attaching bands 11A,11B and retaining straps 11C,11D. The main components of the data glove 10 are of thick, transversely ribbed high-tear-strength polyurethane so that the glove can bend to follow flexing movements, i.e. articulation of the wrist and digits. The glove 10 has four finger extensions 10A and a thumb extension 10B which will pass along the back of the fingers and thumb to provide an exoskeleton thereto. Each said extension 10A,10B is in the form of an elongate generally resilient rib member having a plurality of laterally extending reinforcement ribs 10C. To ensure that the elongated finger and thumb extensions 10A, 10B of the glove follow flexing movements of the fingers and thumb of the wearer each has a hoop or ring formation 14 providing a generally annular ring member near its tip. These ring members 14 may be integrally formed with the extensions 10A,10B or of the component construction hereinafter described. Additionally, similar ring members 13 are provided in spaced relation to the ring members 14 intermediate the ends of the finger and thumb portions 10A,10B.

Illustrated at 15 is a sheath through which flexible cables, ducts and any other necessary facilities may pass to manifolds 16A,16B on the backs of the wrist and hand portions of the glove 10. Manifold 16B provides an overhand member to palm band or strap 16C. A torsionally and laterally flexible corrugated member 16D connects manifold 16A to manifold 16B.

Figure 5:
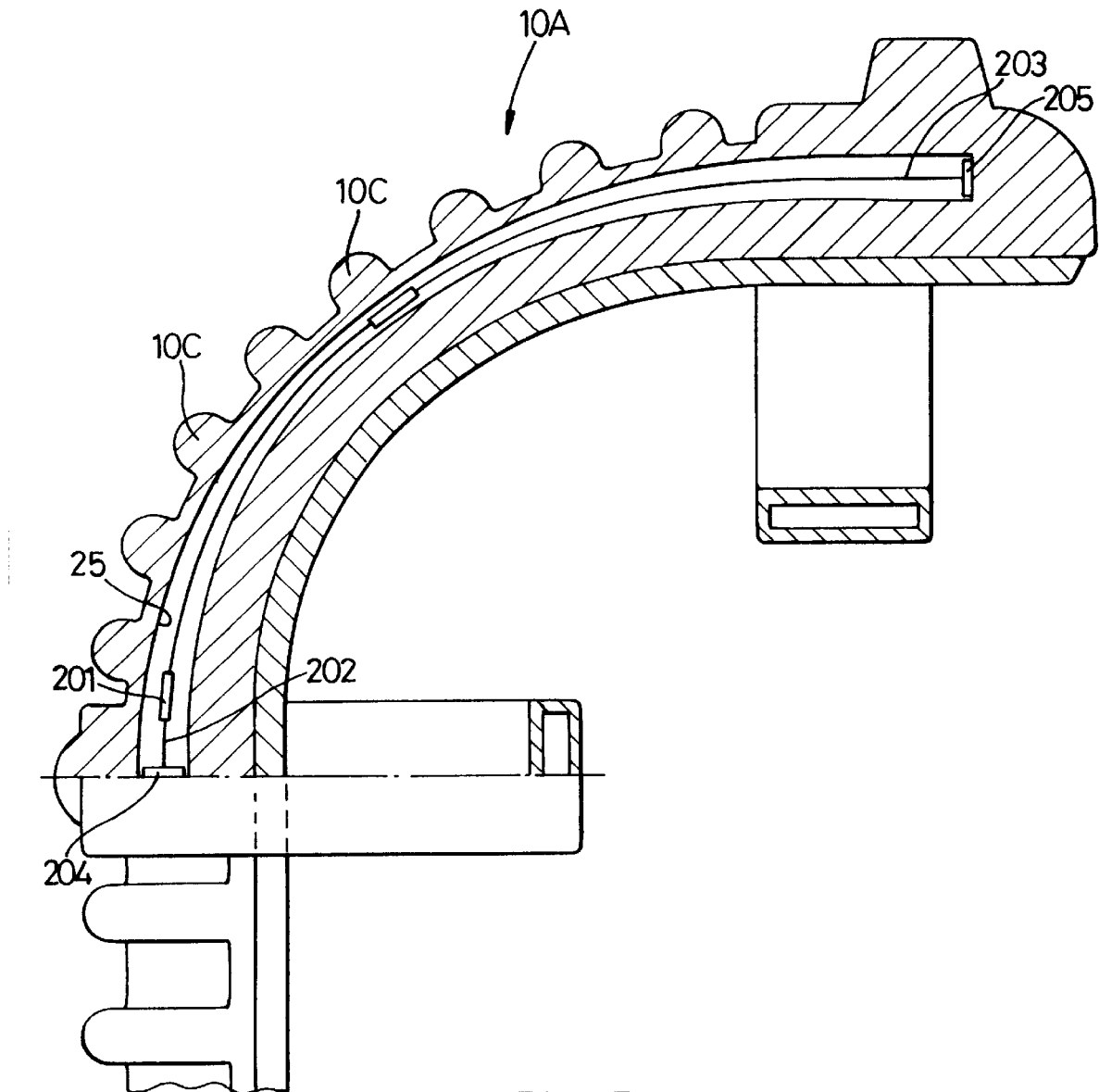
FIG. 5 is a detailed view of the partially sectioned digital member of FIG. 4 shown flexed.

Each of the fingers and thumb has means for generating a signal proportional to the flexing movement of that part of the glove relative to other parts, for example as illustrated in FIG. 5, there is housed within a longitudinal passageway 25 a goniometer strain gauge apparatus which generates electrical signals proportional to a tension loading. The goniometer comprises a strain gauge element 201 from which extends wires 202,203 that are firmly anchored to the glove 10 at respective anchor points 204,205. It will be appreciated that similar goniometers can be provided in ducts disposed between each ring member 13,14, and between ring member 13 and manifold 16B. In addition a plurality of laterally spaced ducts (not shown) may extend through member 16D with each containing a goniometer extending between manifolds 16B and 16A with the arrangement providing that lateral and torsional flexure of the member 16D can be monitored. Although, a simple goniometer is hereindescribed it will be understood that any suitable instrument responsive to the flexure of portions of the glove can be used.

Means (not shown) is additionally provided for generating signals according to the position of the glove 10 in space. Typically, such means is provided by a transmitter or a receiver of a spatial position sensing apparatus with the transmitter or receiver being housed in manifold 16A. A second transmitter or receiver of a further spatial position sensing apparatus may be housed within manifold 16B which if sensitive to torsional movement of member 16D would obviate the need for a plurality of goniometers extending through that member.

The aforementioned position and flexure monitoring means are of well known type and so will not be further described, except to say that in use of the data glove 10 the appropriate signals pass to a computer 30 via line 31. The computer generates a cursor viewed on a visual display system 32 by the wearer in such a way that the cursor undergoes changes corresponding with movement and flexure of the hand. The computer 30 also generates virtual objects viewed on the visual display system 32 and monitors interaction between them and the cursor caused by movement and flexing of the real hand wearing glove 10. The visual display system 32 may be a visual display unit of any known, conventional kind or may be an optical system employing liquid crystal VDU's individual to the eyes of the user of the kind described in the aforementioned U.S. patents.

Figure 2:
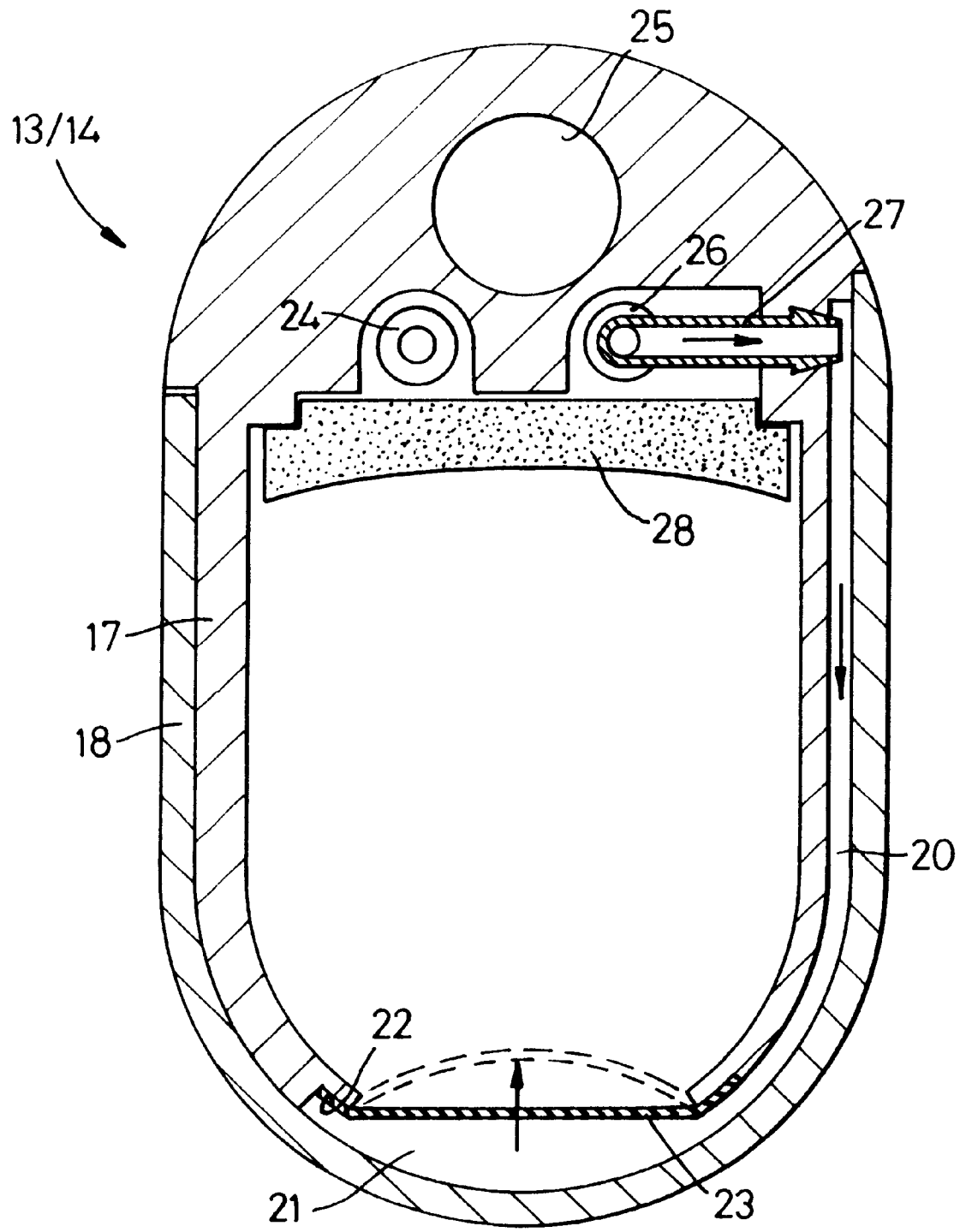
FIG. 2 is a cross-sectional view taken on the line II—II of FIG. 1.
Figure 3:
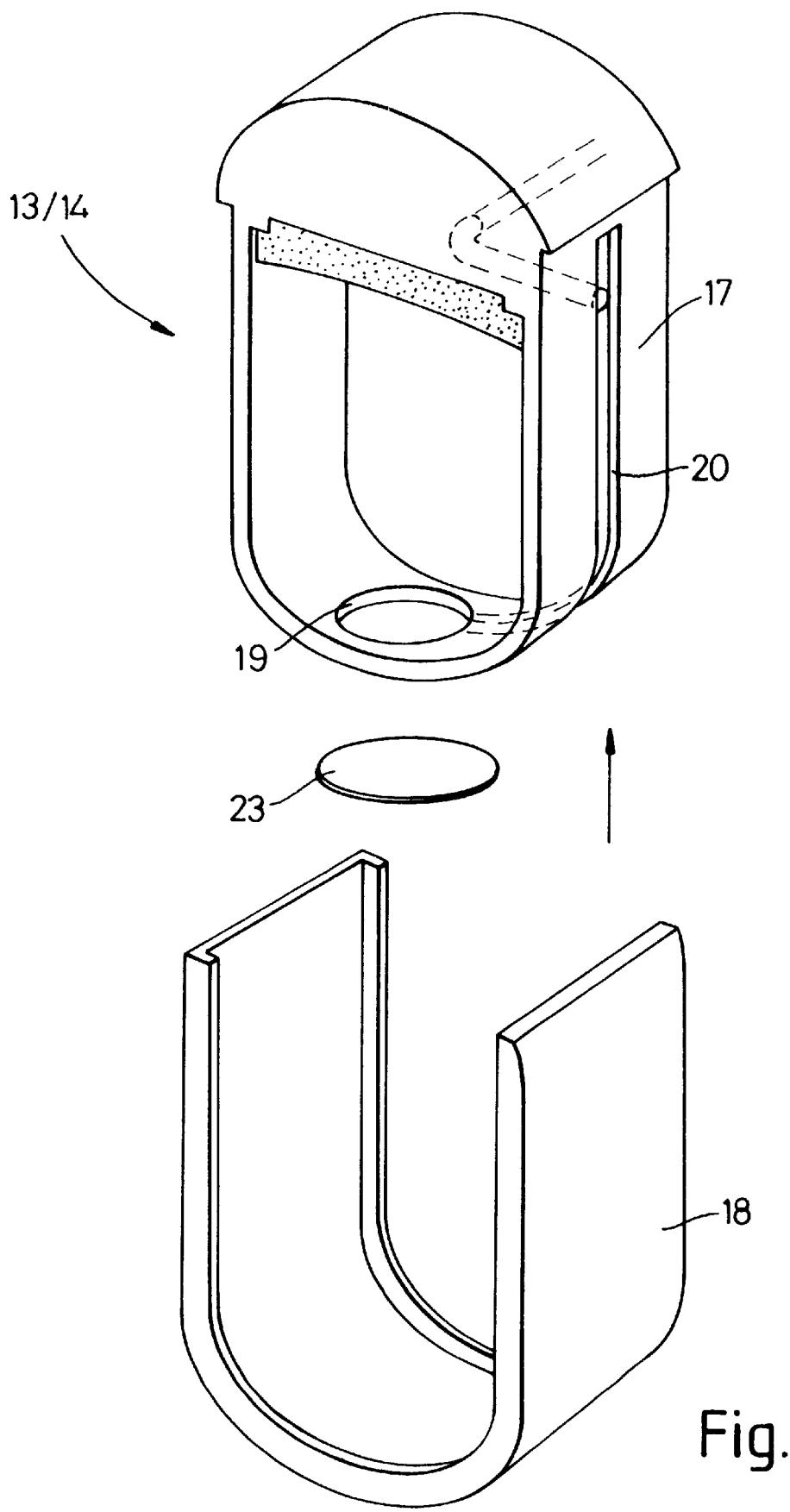
FIG. 3 is an exploded view of the assembly of FIG. 2.
Figure 4:
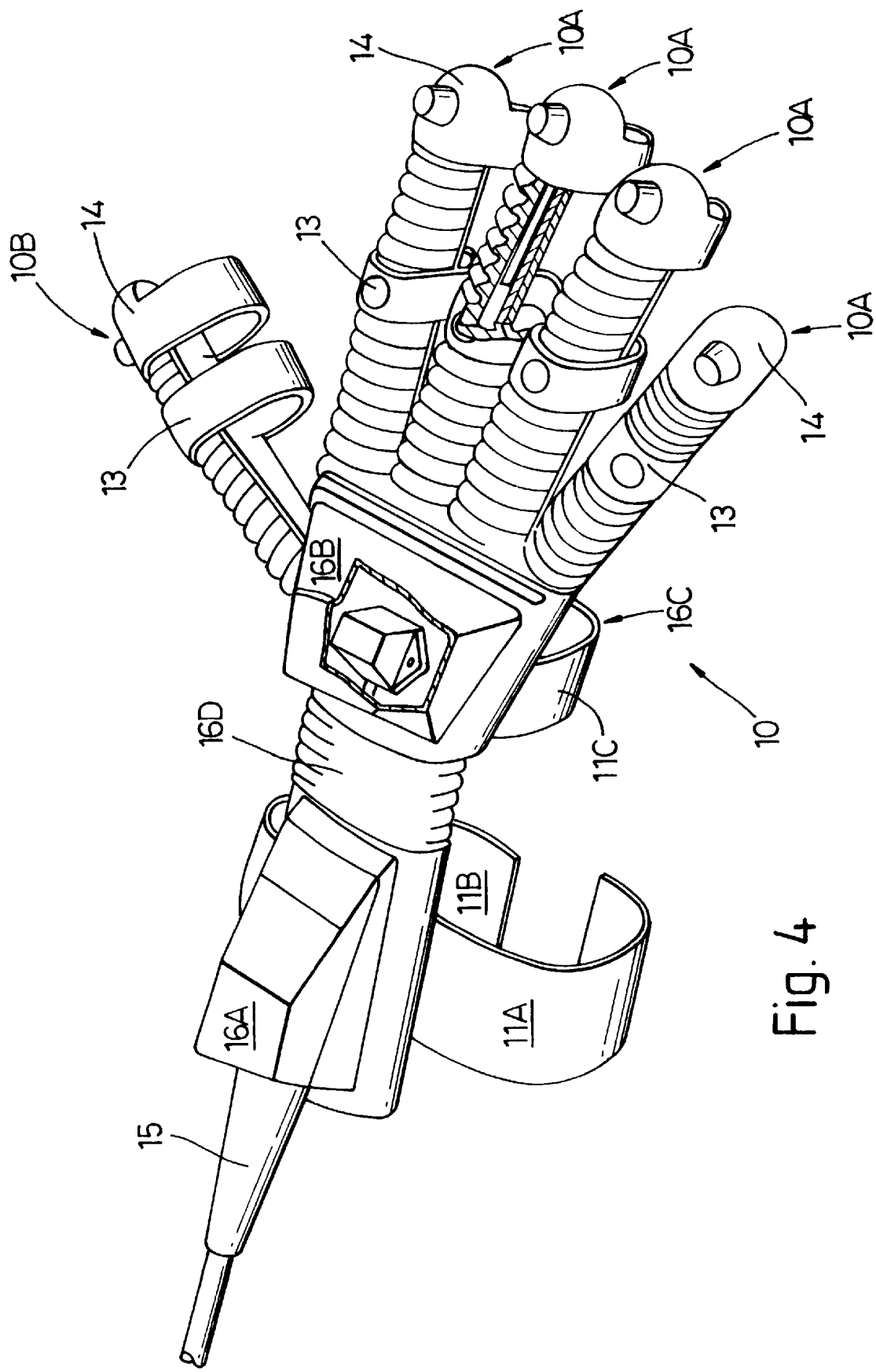
FIG. 4 is a top view of the data glove shown in FIG. 1 having one digital member in partial section.

As shown more clearly in FIGS. 2 and 3 each ring member 13 and 14 comprises U-shaped inner 17 and outer 18 parts of which the inner is integral at the distal ends of its limbs with the associated finger or thumb portion 10A or 10B of the glove and so forms therewith a generally annular ring structure which will surround the thumb or finger, causing the finger or thumb portion of the glove to conform to its flexing movements. The web of the inner part 17 is formed with an aperture 19 and one of its limbs with a channel or groove 20 communicating at one end with the aperture. When the inner part 17 is nested in the outer part 18 as shown in FIG. 2 the groove 20 forms a conduit or passageway and the aperture 19 the opening of a blind bore 21 in the assembly. Around the aperture 19 the inner part 17 is undercut at 22 to provide a seat for the periphery of a membrane 23 of neoprene which spans the aperture 19. This membrane 23 is very much more elastically deformable than the material of the remainder of the glove. Locally the polyurethane of the ring member 13 or 14 is at least twice as thick as the membrane 23 at the bottom of and around the blind bore. It will be appreciated that in comparison the neoprene of membrane 23 the polyurethane material of ring member 13 or 14 can be considered as relatively inextensible.

The periphery of the membrane 23 is fixed in a gas tight manner to the inner part 17 and the membrane is of a sufficiently resilient material to deform in response to the presence of a super-atmospheric pressure in the cavity 21. The membrane 23 is shown in its unstressed condition in full lines in FIG. 2 and in a deformed or expanded condition in dotted lines. Due to its lesser thickness and greater deformability it will be the membrane and not the parts 17 and 18 which will respond to excess pressure in the cavity 21 by deforming. The bore 21 thus provides a substantially solid, non-deformable housing and the combined parts 17 and 18 ensure that substantially all reaction forces are vectored and act upon the membrane 23 to deform it inwardly of the ring member 13 or 14.

Parallel with the passageway or duct 25 are further ducts 24 and 26 for pressurised air or hydraulic fluid. A union 27 joins the duct 26 to the passageway 20. The duct 24 bypasses the ring member 13 shown in FIG. 2 and conveys pressurised fluid to the blind bore of the finger-tip ring member 14 of the same finger portion of the glove 10. At the top of the ring its inner side is covered by a foam pad 28 which promotes wearer comfort and also serves to cover the channels in the finger or thumb part in which the air ducts 24 and 26 are located.

In the use of the glove 10 shown the air ducts 24 and 26 are each connected through the sheath 15 and via two-way air lines 36 with a source 33 of air under pressure controlled by a valve assembly 34 which is in turn under the control of the computer 30. A suitable valve assembly 34 is the 12 valve EV/ET Electrical/Pneumatic Interface Card available from Clippard Instrument Laboratory, Inc. of U.S.A. When the computer 30 determines that a particular finger or thumb of the wearer of the glove 10 has 'touched' a virtual object as viewed on the visual system 32 it opens the appropriate valve of assembly 34 so that the bore 21 of the appropriate ring member or members 13,14 is inflated. This causes the associated membrane(s) 23 to deform into contact with wearer's finger or thumb to provide a tactile stimulus corresponding to the 'touch', and the pressure(s) of the membrane(s) 23 on the human body may be stronger or weaker depending on the nature of the 'touch' condition determined by computer 30. In the absence of a 'touch' condition determined by computer 30 air is allowed to escape to atmosphere from the appropriate blind bores 21 through an exhaust line 35 controlled by the valve assembly 34.

It will be evident that only those bores 21 will be inflated and membranes 23 deformed which correspond with the determined 'contact'. Thus if only part of the viewed representation of the hand meets a virtual object only the corresponding part of the real hand will experience pressure, i.e. tactile stimulation. Realism will of course be enhanced by multiplying the bores 21 throughout the glove 10 and by making the pressure within each proportional to the notional load on the associated part of the hand.

It will be understood that the glove 10 may be provided with other tactile feedback means of known type or such feedback means may be omitted altogether if for example the glove 10 is to be used solely as an input control device. However, for the avoidance of doubt although the invention as hereinafter claimed is directed toward constructional features of glove 10 this should not be taken to estop Applicant from revising or redirecting the claims to include features claimed in the parent Application. Also, although a virtual reality application is hereindescribed the glove 10 may be used as a control device for a remote robotics arm and gripper, for example. Consequently, the use of a computer system is to be taken to encompass any electrical or electronic interface whether using integrated circuitry or not.

The aforedescribed construction of glove 10 permits rapid and relatively trouble free donning and doffing. Strap 11A, 11B is typically of wrap-around velcro fixing type and readily adapts to the wrist dimension of any user. Typically palm band 16C is of more robust construction and comprises two elongate polyurethane members 11C,11D connected by fixing means 11E which may be in the form of an elongate rack being constrained in a ratchet housing fixed to member 11C. Alternatively, some form of buckle or other arrangement could be provided. It may be desired that the palm band 16C, is of fixed circumference possibly of unitary construction. Typically, this could be integral with the glove 10 or an elasticated strap.

I claim:

1. A manually operable exo-skeletal human/computer interface device for a computer system comprising a wrist encircling means and a palm encircling means and a torsionally and laterally deformable member flexibly connecting said wrist and palm encircling means, with said wrist encircling means being adapted in use to be proximate to and generally relatively fixed around the associated wrist of one hand of a user, with said palm encircling means being adapted in use to be proximate to and relatively fixed around the palm of said hand, with said palm encircling means having an overhand member overlying the back of said hand, further comprising at least one elongate generally resilient rib member extending at a fixed end thereof from said overhand member so as to be generally coextensive with at least one finger of said hand in order to function in the form of an exoskeleton thereto, adjacent a free end of said rib member at least one annular ring formation which is adapted in use to receive and engage at least one finger of the said hand, said palm encircling means and said ring formation being mutually spaced along the rib member and at least one position sensor of the computer system fixed relative to at least one of the said members.

2. A device in accordance with claim 1, wherein said ring formation is formed integrally with the said elongate member.

3. A device in accordance with claim 1, wherein said ring formation is in the form of a hoop comprising an inner U-shaped component nested in an outer U-shaped component, said outer U-shaped component being integral at the free end of said elongate member.

4. A device in accordance with claim 1, wherein an elongate bore extends longitudinally through said elongate rib member and a strain gauge goniometer is housed within said bore.

5. A device in accordance with claim 1, wherein communications apparatus of a spatial position sensing device is housed within said overhand member.

6. A device in accordance with claim 1, wherein communications apparatus of a spatial position sensing device is housed within said wrist encircling means.

7. A device in accordance with claim 1, wherein tactile feedback means is provided as part of said annular ring formation.

8. A device in accordance with claim 1, wherein said palm encircling means is of fixed circumference when in a free and unstressed state.

9. A device in accordance with claim 8, wherein said palm encircling means comprises an elasticated strap.

10. A manually operable exo-skeletal human/machine interface device for a computer system comprising a torsionally and laterally deformable member flexibly connecting said wrist encircling means to a palm encircling means, with said wrist encircling means being adapted in use to be proximate to and generally relatively fixed around the associated wrist of one hand of a user, with said palm encircling means being adapted in use to be proximate to and relatively fixed around the palm of said hand, with said palm encircling means having an overhand member overlying the back of said hand, further comprising five elongate generally resilient rib members each corresponding to an associated digit of the hand and each extending at a fixed end thereof from said overhand member so as to be generally coextensive with the associated digit in order to function in the form of an exoskeleton thereto, adjacent a free end of each said rib member at least one annular ring formation which is spaced along the rib member from said palm encircling means and adapted in use to receive and engage said associated digit, and at least one position sensor of the computer system fixed relative to at least one of the said members.

11. A device in accordance with claim 10, further comprising a second annular ring formation depending from one of said rib members intermediate the said two ends thereof.

12. A device in accordance with claim 10, further comprising second annular ring formations each depending from a corresponding one of said rib members intermediate the said two ends thereof.

13. A manually operable exo-skeletal human/computer interface device for a computer system comprising a wrist encircling means and a palm encircling means and a torsionally and laterally deformable member flexibly connecting said wrist and palm encircling means, with said wrist encircling means being adapted in use to be proximate to and generally relatively fixed around the associated wrist of one hand of a user, with said palm encircling means being adapted in use to be proximate to and relatively fixed around the palm of said hand, with said palm encircling means having an overhand member overlying the back of said hand, further comprising at least one elongate generally resilient rib member extending at a fixed end thereof from said overhand member so as to be generally coextensive with at least one finger of said hand in order to function in the form of an exoskeleton thereto with said elongate member having an upper surface and a plurality of integrally formed laterally extending reinforcement ribs disposed along said upper surface, adjacent a free end of said rib member at least one annular ring formation which is spaced along the ring member from the palm encircling means and adapted in use to receive and engage at least one finger of the said hand, and at least one position sensor of the computer system fixed relative to at least one of the said members.

14. A manually operable exo-skeletal human/computer interface device for a computer system comprising a wrist encircling means and a palm encircling means and a torsionally and laterally deformable member flexibly connecting said wrist and palm encircling means, with said wrist encircling means being adapted in use to be proximate to and generally relatively fixed around the associated wrist of one hand of a user, with said palm encircling means being adapted in use to be proximate to and relatively fixed around the palm of said hand, with said palm encircling means having an overhand member overlying the back of said hand, further comprising at least one elongate generally resilient rib member extending at a fixed end thereof from said overhand member so as to be generally coextensive with at least one finger of said hand in order to function in the form of an exoskeleton thereto, adjacent a free end of said rib member at least one annular ring formation which is spaced along the ring member from the palm encircling means and adapted in use to receive and engage at least one finger of the said hand, at least one position sensor of the computer system fixed relative to at least one of the said members, and a portion of sid rib member has movement sensing means associated therewith.

15. A device in accordance with claim 14, wherein at least a portion of said rib member has an elongate passageway extending therealong which houses said movement sensing means.

16. A device in accordance with claim 14, wherein at least one elongate passageway extends through said laterally flexible member between said wrist encircling means and said palm encircling means with said passageway housing movement sensing means.

17. A manually operable exo-skeletal human/computer interface device for a computer system comprising a wrist encircling means being adapted in use to be proximate to and generally relatively fixed around the associated wrist of one hand of a user, an overhand member in use overlying the back of said hand and a deformable member flexibly connecting said wrist encircling means to said overhand member, further comprising at least one elongate generally resilient rib member extending at a fixed end thereof from said overhand member so as to be generally coextensive with at least one finger of said hand in order to function in the form of an exoskeleton thereto, adjacent a free end of said rib member and spaced therealong from the overhand member at least one annular ring formation which is adapted in use to receive and engage at least one finger of the said hand, and at least one position sensor of the computer system fixed relative to at least one of the said members.

18. A device in accordance with claim 17, further comprising a palm encircling means associated with said overhand member, wherein said palm encircling means is of fixed circumference when in a free and unstressed state.

19. A device in accordance with claim 18, wherein said palm encircling means comprises an elasticated strap.

* * * * *